United States Patent [19]

Ward

[11] 4,116,867

[45] Sep. 26, 1978

[54] REJUVENATION OF NITROGEN-DAMAGED NOBLE METAL ZEOLITE CATALYSTS

[75] Inventor: John W. Ward, Yorba Linda, Calif.

[73] Assignee: Union Oil Company of California, Los Angeles, Calif.

[21] Appl. No.: 814,339

[22] Filed: Jul. 11, 1977

[51] Int. Cl.$^2$ .................... B01J 29/38; B01J 29/12; C10G 13/10
[52] U.S. Cl. .................... 252/416; 208/111; 252/419; 252/455 Z
[58] Field of Search ............ 252/419, 416, 455 Z; 208/111, 140

[56] References Cited

U.S. PATENT DOCUMENTS

| | | | |
|---|---|---|---|
| 3,011,968 | 12/1961 | Webb | 208/140 |
| 3,197,399 | 7/1965 | Wight et al. | 252/416 |
| 3,287,257 | 11/1966 | Hansford et al. | 208/111 |
| 3,535,272 | 10/1970 | Kittrell et al. | 252/416 |
| 4,064,036 | 12/1977 | Clark | 208/46 |

FOREIGN PATENT DOCUMENTS 2,424,168  12/1974  Fed. Rep. of Germany ........... 252/416

*Primary Examiner*—P. E. Konopka
*Attorney, Agent, or Firm*—Lannas S. Henderson; Richard C. Hartman; Dean Sandford

[57] ABSTRACT

Certain hydrocarbon conversion catalysts comprising a Group VIII noble metal in an oxidized state, dispersed on a crystalline hydrogen zeolite, e.g. Y zeolite, are found to suffer a drastic loss in activity upon exposure to nitrogen at elevated temperature. It is now found that this damage can be substantially completely reversed by subjecting the catalyst to oxidation with an oxygen-containing gas.

8 Claims, No Drawings

REJUVENATION OF NITROGEN-DAMAGED NOBLE METAL ZEOLITE CATALYSTS

BACKGROUND AND SUMMARY OF INVENTION

The present invention arose from experiences encountered in the pressure-testing of certain catalyst-loaded reactors with nitrogen gas. In the commercial startup of processes utilizing high-pressure hydrogen, e.g. hydrocracking, it is common practice to carry out a preliminary pressure test of the high-pressure system, including a catalyst-loaded reactor, in order to insure against possible leakage of combustible gases during subsequent processing. Commonly, for safety reasons an inert gas is employed for this pressure testing, nitrogen being preferred for economy reasons. For most operations nitrogen performs very satisfactorily, but for reasons which are still largely conjectural, at elevated temperatures (above 200° F) nitrogen, in the absence of oxygen, has been found to have a substantial adverse effect upon certain catalysts comprising a Group VIII noble metal supported on crystalline aluminosilicate zeolites, wherein the zeolite support has been substantially converted to a hydrogen and/or dehydroxylated form. In some cases, it has been found that after undergoing nitrogen pressure testing, the activity of such catalysts for hydrocracking and/or hydrogenation is drastically reduced, to levels of only a small fraction of the initial fresh activity.

Surprisingly, seemingly analogous catalysts based on metal-stabilized crystalline zeolites, such as magnesium-stabilized zeolites, do not appear in their fresh state to be affected adversely by high-temperature nitrogen. Another puzzling aspect of the invention is that the damage appears to occur only when the catalyst is in an oxidized state (as after oxidative regeneration or air calcination of the fresh catalyst); in its reduced state, little or no damage occurs.

In view of the foregoing, it would appear that the above noted damage could be avoided by either of two possible expedients. Firstly, since the nitrogen damage becomes significant only at temperatures above about 200° F, pressure testing could be carried out at temperatures sufficiently low to avoid significant damage. However, this alternative would be hazardous in many cases due to the "hydrogen-embrittlement" which many catalytic reactor composed of ferrous alloys may have previously undergone through extended use at high hydrogen pressures. When such embrittlement occurs, the "transition temperature" of the reactor walls may substantially increase, to levels in the range of about 200°–300° F. The transition temperature is the temperature below which cracks in the reactor wall will propagate (at a given operating pressure) in an instantaneous, catastrophic manner, and above which cracks will be arrested by the inherent toughness of the metal. It is hence considered a prudent safety measure to conduct pressure testing (at pressures in excess of about 700 psig) only at temperatures above about 200° F, and preferably above about 300° F.

Secondly, as disclosed in U.S. Pat. No. 4,064,036 nitrogen damage can be avoided by pre-reducing the catalyst at low temperatures and pressures with a dilute non-combustible mixture of hydrogen and nitrogen prior to the pressure testing. This procedure permits prereduction to be carried out safely without danger of fires or explosions in the event of leakage from the reactor, and the resulting catalyst is not damaged upon subsequent pressure testing with nitrogen. However, it is not always convenient to carry out such a prereduction; and in other cases a need may suddenly arise to blanket the hot catalyst with nitrogen to isolate it from some reactive gas such as hydrogen, oxygen, or hydrocarbons. In such cases, a post-treatment would be desirable to reverse any damage which occurs.

I have now discovered that nitrogen damage of the type noted above can be substantially completely reversed by subjecting the catalyst to a simple, relatively short oxidation treatment with an oxygen-containing gas at elevated temperatures and relatively low pressures. The efficacy of this treatment is very surprising in view of the fact that the catalyst, prior to contact with nitrogen, was already in an oxidized state which presumably would not be altered by contact with nitrogen. Apparently however, this particular type of catalyst does catalyze the production of some type of oxidizable component upon contact with nitrogen at elevated temperature, a phenomenon which does not occur with other seemingly analogous catalysts.

PRIOR ART

U.S. Pat. No. 3,197,399 to Wight et al discloses the use of a reduction-oxidation sequence for reactivating certain non-preferred types of catalysts described herein which have been partially deactivated by contact, in their oxidized state, with water vapor at elevated temperatures. In the present case however, the damaging nitrogen atmosphere is substantially anhydrous, usually containing no more than about 50 ppmv of water vapor. Also, the present oxidation treatment is performed without the preceding hydrogen reduction treatment of said patent.

DETAILED DESCRIPTION

The present invention is especially contemplated for use in connection with catalysts comprising a crystalline, hydrothermally stabilized, low-sodium, metal-cation-deficient zeolite base (preferably Y zeolite) upon which is deposited a minor proportion, e.g., about 0.1–2 weight-percent of a Group VIII noble metal hydrogenating component, preferably palladium and/or platinum. The term "metal-cation-deficient" refers to hydrogen and/or dehydroxylated zeolites in which not more than 50%, preferably not more than about 25% of the original zeolitic ion exchange capacity is satisfied by metal cations. The term "hydrothermally stabilized" means a metal cation deficient zeolite which has been thermally or hydrothermally pretreated to achieve structural stability against the effects of steam at high temperatures. Another characteristic of the zeolites utilized herein is their low sodium content, which is less than 3 weight-percent, and usually less than about 1%, as $Na_2O$. A particularly preferred class of catalysts to which the present invention may be usefully applied is described in my U.S. Pat. No. 3,897,327. Other stabilized hydrogen Y zeolite catalyst bases are described in U.S. Pat. Nos. 3,449,070 3,403,519, 3,292,192 and 3,354,077.

In nearly all cases, the final step in manufacture of the foregoing catalysts consists of a calcination in air at temperatures of about 700°–1200° F, to effect final dehydration, decomposition of any remaining zeolitic ammonium ions, and conversion of the noble metal component to an oxide form. It is in this form, or in the form resulting from conventional oxidative regeneration to remove coke deposits, that the catalyst is most susceptible to deactivation by elemental nitrogen at temperatures above 200° F, and especially above about 300° F. The degree of damage incurred depends of course upon the duration of contact with nitrogen, the temperature and pressure. Substantial damage can occur over a contact time of 1 hour, at 400° F and 1500 psig.

The rejuvenation treatment is preferably carried out by passing a stream of substantially dry oxidizing gas containing about 0.5–10 vol.% oxygen through the catalyst bed at temperatures between about 400° and 1200° F, pressures between about 10 and 500 psig, and at gas hourly space velocities (GHSV) between about 300 and 5000 SCF/Hr/CF of catalyst. The remainder of the oxidizing gas may comprise any inert gas, preferably nitrogen. In a flowing stream of nitrogen gas, the presence of as little as 0.5 vol.% oxygen not only prevents further nitrogen damage to the catalyst, but also brings about a reversal of prior deactivation by nitrogen. The water vapor content of the influent oxidizing gas should preferably be below about 50 ppmv.

In order to avoid possible explosions and fires resulting from oxidation of hydrocarbonaceous residues which may remain as pockets or deposits in various portions of the reactor system, the partial pressure of oxygen in the oxidizing gas should be maintained below about 30 psi, preferably between about 0.5 and 10 psi.

The time required to complete the rejuvenation varies over a wide range, between about 1–100 hours, depending upon the particular catalyst and the oxidation conditions utilized. High temperatures, gas flow rates and oxygen concentrations of course favor rapid rejuvenation, while low temperatures, gas flow rates and oxygen concentrations will extend the time required. Also, under any given set of conditions, the required rejuvenation time will vary depending upon the particular catalyst and the degree of deactivation it has undergone. It is hence necessary in each case to establish experimentally, by appropriate sampling and activity testing of the catalyst at various time intervals, what the minimum rejuvenation time will be. The catalyst is not harmed however if this minimum time is exceeded.

A preferred procedure consists in initiating the rejuvenation at low temperatures and oxygen concentrations, e.g. 400°–500° F and 0.5–1% $O_2$, and incrementally raising temperatures at about 20°–50° F per hour to maximum values in the 750°–1200° F range. The oxygen concentration is then raised to about 2–5% while maintaining temperatures in the 750°–1200° F range for about 0.5–5 hours. By operating in this manner, uncontrollable localized oxidation exotherms are avoided.

Upon completion of rejuvenation, and after purging all oxygen from the reactor, process hydrogen flow is established, with incremental heatup over a period of several hours to achieve process temperatures. Final activation (reduction) of the catalyst also takes place during the heatup period, after which the desired process feedstock is introduced into the flowing, preheated hydrogen stream.

To substantiate the critical features of the invention, the following non-limiting examples are cited:

EXAMPLE 1

A 150 ml sample of a calcined composite of 0.5 wt.% Pd supported on a 20% $Al_2O_3$-80% steam-stabilized hydrogen Y zeolite base (0.2 wt.% $Na_2O$) of the type described in U.S. Pat. No. 3,897,327 was loaded into a reactor for activity testing. Prior to the activity test, the reactor was pressure-tested at 1500 psig with nitrogen at room temperature. After activating the catalyst with hydrogen at 1450 psig, 2200 GHSV and temperatures increasing at the rate of about 50° F per hour up to hydrocracking temperature, a standard hydrocracking activity test was carried out at 1450 psig, 1.7 LHSV and 8000 SCF/B of hydrogen, using as the feed a substantially nitrogen-free 400°–850° F boiling range gas oil containing 0.5 wt.% sulfur. Activity was measured in terms of the temperature required to maintain 52–54 volume-percent conversion per pass to 420° F endpoint gasoline after 100 hours on stream. This temperature was found to be 496° F, which is essentially the fresh activity of the catalyst as determined without a prior pressure test. Thus, nitrogen at room temperature has no significant adverse effect on the catalyst.

EXAMPLES 2–4

Three additional 150 ml samples of the catalyst employed in Example 1 were subjected to the same hydrocracking activity test, after having encountered nitrogen at elevated temperatures during a pressure testing sequence in which the reactor and catalyst were:

(1) Pressured to 200 psig with nitrogen flowing at 12 cf/hr.;

(2) Heated to the desired pressure-test temperature (200°, 300° and 400° F) at the rate of 25° F/hr.;

(3) Held at 200 psig in flowing nitrogen for a total of 16 hours, including heatup time; and (4) Pressured to 1800 psig with nitrogen under no-flow conditions and held for 2 hours at the desired pressure test temperature (200°, 300° and 400° F). Activating and testing the respective catalysts as in Example 1 gave the following results:

TABLE I

| Example | Pressure Test Temp., °F | Temp. Required for 52–54% Conversion, °F | Loss in Activity, °F |
|---|---|---|---|
| 1 | ~70 | 496 | — |
| 2 | 200 | 511 | 15 |
| 3 | 300 | 537 | 41 |
| 4 | 400 | 616 | 120 |

The significance of the above losses in activity can be appreciated from the fact that each 20° F loss corresponds to a kinetic activity loss of about ½. Thus, the 120° F loss in Example 4 means that the catalyst is only about 1/64 as active as the catalyst from Example 1, on the basis of volume of catalyst required to maintain the same conversion at the same temperature.

EXAMPLE 5

The 400° F pressure test of Example 4 was repeated, but was followed by an oxidative rejuvenation procedure wherein the catalyst was contacted at 200 psig and 2200 GHSV with a stream of 1% $O_2$-99% $N_2$ at temperatures increasing at 25°–30° F/Hr to 860° F. After holding at 860° F for 2 hours, the oxygen content of the gas stream was increased to 3 vol.%, and the temperature was held at 800° F for 2 hours. The reactor was then cooled to room temperature and purged to remove all oxygen. After activating with hydrogen the catalyst was activity tested as described in Examples 1–4, and found to require a temperature of only 513° F to give 52–54% conversion. Thus, as a result of the oxidation treatment, the 120° F loss in activity of Example 4 was reduced to only 17° F.

The following claims and their obvious equivalents are believed to define the true scope of the invention.

I claim:

1. A method for rejuvenating a catalyst comprising a Group VIII noble metal hydrogenating component supported on a hydrogen- and/or decationized crystalline aluminosilicate zeolite base, said catalyst being substantially free of carbonaceous deposits but having been partially deactivated by contact, in its oxidized state, with substantially oxygen-free elemental nitrogen at temperatures above 200° F, which comprises subjecting said partially deactivated catalyst without intervening reduction, to oxidation with a flowing stream of an oxygen-containing gas at temperatures between about 400° and 1200° F, and thereafter reducing the oxidized catalyst with hydrogen.

2. A method as defined in claim 1 wherein said noble metal is palladium and said zeolite is Y zeolite.

3. A method as defined in claim 2 wherein said Y zeolite is a steam stabilized hydrogen Y zeolite wherein not more than about 50% of its original ion exchange capacity is satisfied by metal cations.

4. A method as defined in claim 1 wherein said oxidation is carried out at a pressure between about 10 and 500 psig.

5. A method as defined in claim 1 wherein said contacting with elemental nitrogen occurred during pressure testing with nitrogen of a reactor loaded with said catalyst, said pressure testing having been carried out at a temperature above about 300° F and a pressure above about 750 psig.

6. A method as defined in claim 5 wherein said noble metal is palladium and said zeolite is Y zeolite.

7. A method as defined in claim 6 wherein said Y zeolite is a steam stabilized hydrogen Y zeolite wherein not more than about 50% of its original ion exchange capacity is satisfied by metal cations.

8. A method as defined in claim 5 wherein said oxidation is carried out at a pressure between about 10 and 500 psig.

* * * * *